United States Patent [19]
Albrecht

[11] 3,817,343
[45] June 18, 1974

[54] INSTALLATION FOR BRAKE OF MOTOR VEHICLES WHICH ARE DRIVEN FROM A GAS TURBINE

[75] Inventor: Gunther Albrecht, Pullhausen, Germany

[73] Assignee: Daimler-Benz Aktiengesellschaft, Stuttgart, Germany

[22] Filed: May 20, 1971

[21] Appl. No.: 145,434

[30] Foreign Application Priority Data
May 21, 1970 Germany............................ 2024792

[52] U.S. Cl. .............................. 180/66 R, 188/2 R
[51] Int. Cl.............................................. B60k 3/00
[58] Field of Search..... 188/2 R, 5; 180/66 R, 66 A, 180/66 B

[56] References Cited
UNITED STATES PATENTS
2,256,302  9/1941  Wehmeier......................... 180/66 B
3,433,319  3/1969  McLean............................ 180/66 A Primary Examiner—Albert J. Makay
Assistant Examiner—John Mannix
Attorney, Agent, or Firm—Craig & Antonelli

[57] ABSTRACT

An installation for the braking of motor vehicles which are driven from a gas turbine with a free working turbine by means of a rotary compressor which is arranged either in the power transmission path from the free working turbine to the driven wheels or in parallel thereto.

30 Claims, 6 Drawing Figures

INSTALLATION FOR BRAKE OF MOTOR VEHICLES WHICH ARE DRIVEN FROM A GAS TURBINE

The present invention relates to an installation for braking motor vehicles and, more particularly, to an installation for braking motor vehicles which are driven by a gas turbine including a free output or working turbine.

Gas turbines for the drive of motor vehicles with a free working or output turbine have the disadvantage with respect to piston internal combustion engines that their compressor normally cannot assume any brake work since no direct connection exists from the driving wheels of the vehicle to the compressor. One attempts to eliminate this disadvantage in that one connects the working or output turbine connected with the driving wheels by way of a planetary gear with the gas producer shaft and therewith with the compressor. For that purpose, the output shaft of the planetary gear has to be extended through the shaft of the output turbine constructed as hollow shaft. An expensive installation consisting of a large number of parts results from such an arrangement. In another prior art installation for the braking, the output or working turbine is connected with the gas producer shaft by way of a shaft disposed parallel to the common axis. By reason of the large distance to be bridged, a very long shaft is necessary therefor which requires additional space and necessitates costly bearing supports.

The present invention relates to an installation of the type described above for the braking of motor vehicles which are driven by a gas turbine with a free output or work turbine, by means of a rotary compressor. The present invention is concerned with the task to avoid the aforementioned disadvantages and to provide an effective and readily controllable brake installation which can be accommodated in motor vehicles without large structural expenditures. This is realized according to the present invention in that a rotary compressor of any known type is arranged in the force transmission, i.e., in the power path from the free working turbine to the driven wheels or parallel thereto.

Accordingly, it is an object of the present invention to provide a brake installation for motor vehicles, driven by a gas turbine equipped with a free working turbine which avoids by simple means the aforementioned shortcomings and drawbacks encountered in the prior art.

Another object of the present invention resides in an installation for the braking of motor vehicles of the type described above which is relatively simple in construction, involves relatively few parts and can be readily accommodated into the existing space.

A further object of the present invention resides in an installation for braking motor vehicles which are driven from a gas turbine with a free output turbine which obviates the need for long shafts and costly bearing supports.

These and further objects, features and advantages of the present invention will become more apparent from the following description when taken in connection with the accompanying drawing which shows, for purposes of illustration only, two embodiments in accordance with the present invention, and wherein.

Figure 4:
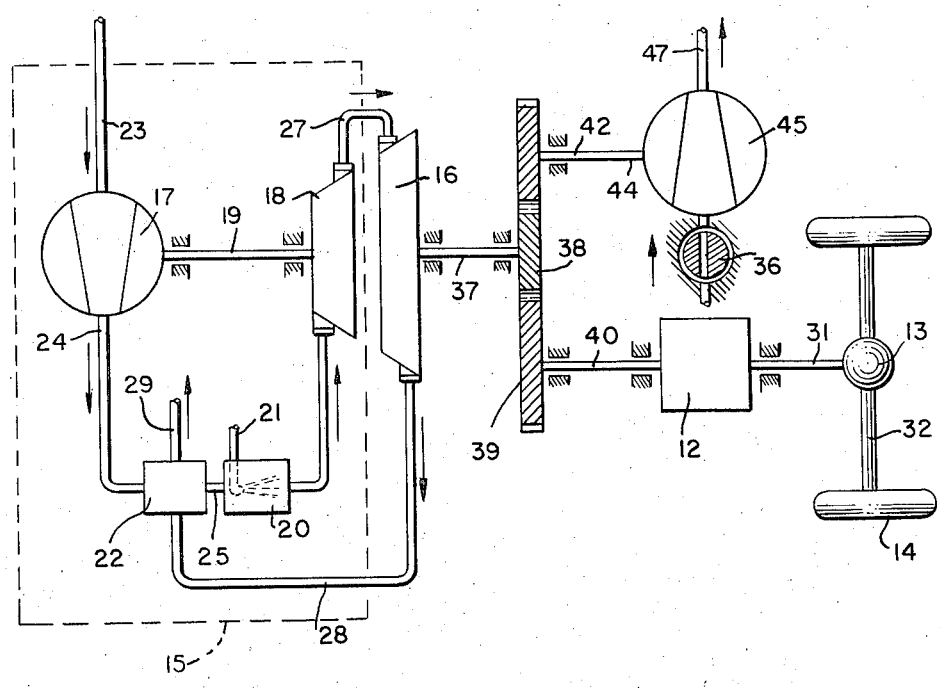
FIG. 4 is a schematic view of a modified embodiment of a brake installation which is arranged parallel to the power transmission similar to the embodiment of FIG. 2 and which utilizes throttle means for controlling the rate of air flow through the rotary compressor means.
Figure 5:
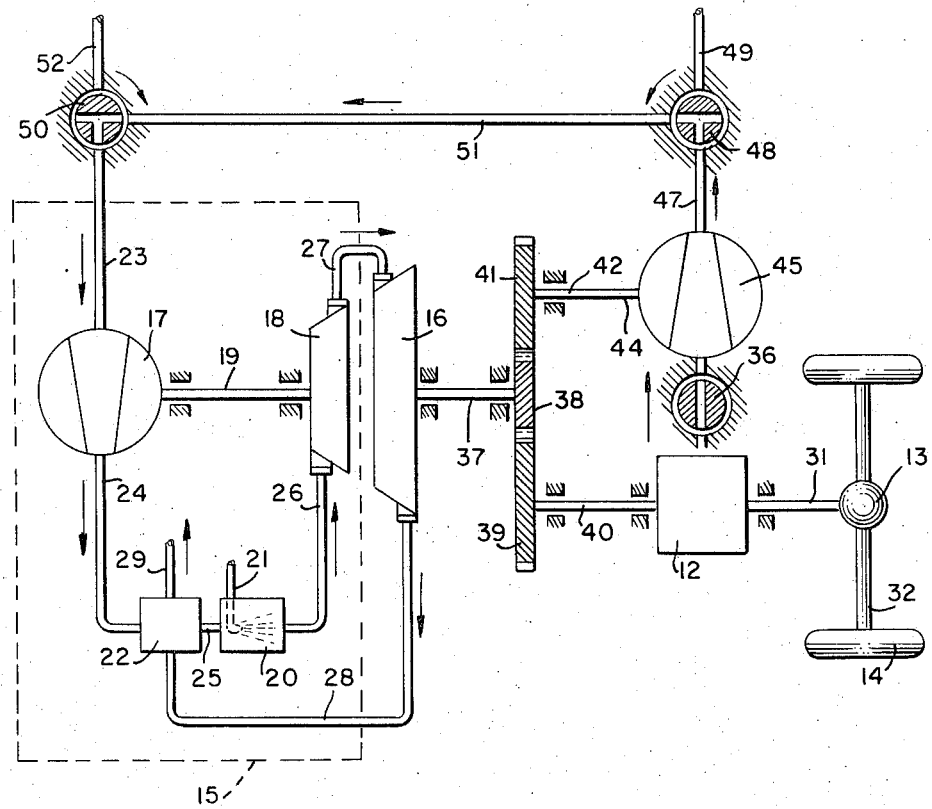
Figure 6:
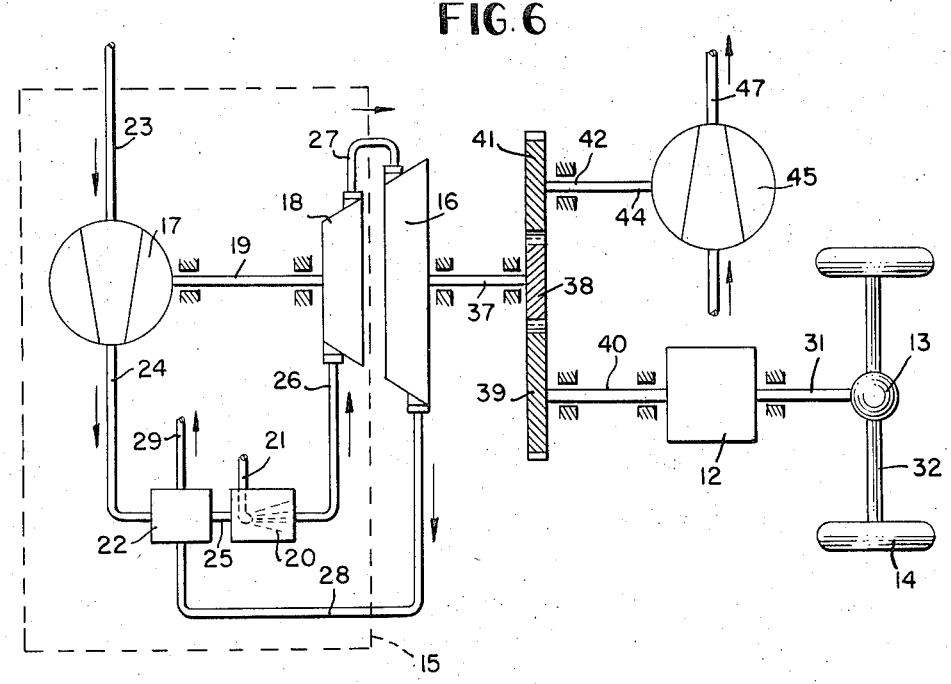

FIG. 5 is a schematic view of a modified embodiment of a brake installation similar to the arrangement of FIG. 4 with the further provision of means for connecting the output side of the rotary compressor means with the input side of the gas producer for the gas turbine; and FIG. 6 is a schematic view of a modified embodiment of a brake installation arranged in parallel to the power transmission from the working turbine to the driven wheels and including a free-wheeling device selectively engaging the rotary compressor means.

Referring now to the drawing wherein like reference numerals are used throughout the views to designate like parts, the drive of the vehicle which may be, for example, a heavy-duty truck, is composed essentially of a gas turbine 11, a change-speed gear 12, a differential gear 13, driving wheels 14 and various transmission elements. The gas turbine 11 consists of a gas producer 15 (FIG. 2) and of a free output or working turbine 16. The gas producer 15 is constituted by a compressor 17 and by a turbine 18 which are arranged on a common shaft 19, by a combustion chamber 20 to which fuel is supplied by way of a line 21, and by a heat exchanger 22. Reference numeral 23 designates a suction channel or duct for the air to be compressed while reference numerals 24 and 25 designate channels or ducts for the compressed air which extend from the compressor 17 to the heat-exchanger 22 and from the latter to the combustion chamber 20, respectively. A channel or duct 26 for the hot gases connects the combustion chamber 20 with the turbine 18 of the gas producer 15 and a channel or duct 27 connects the turbine 18 with the free working or output turbine 16. Finally, a duct or channel 28 for the exhaust gases extends from the working turbine 16 to the heat-exchanger 22 and a duct or channel 29 leads from the latter into the atmosphere.

Figure 1:
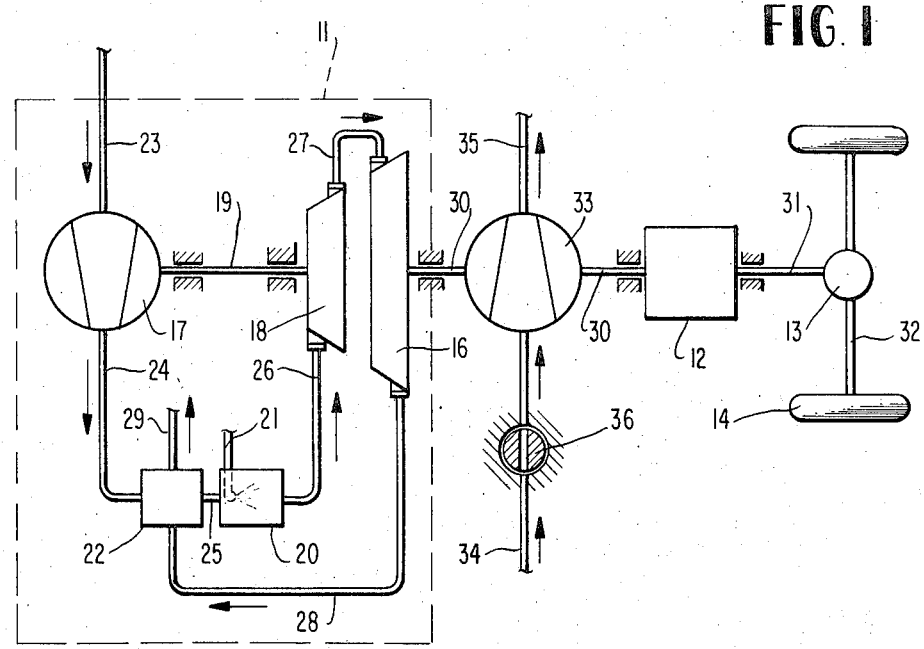
FIG. 1 is a schematic view of a brake installation which is arranged in the power transmission from the working turbine to the driven wheels of a heavy-duty commercial-type motor vehicle equipped with a gas turbine drive.

As shown in FIG. 1, the free working or output turbine 16 transmits its torque by way of a shaft 30 to the change-speed transmission 12. Shafts 31 and 32 transmit the torque from the change-speed gear 12 to the differential gear 13 and to the driving wheels 14. A rotary compressor 33 of any conventional construction which is arranged on the shaft 30 of the force transmission, i.e., of the path of power flow, draws in air through a channel or duct 34 and discharges the compressed air through a channel or duct 35. A throttle 36 of any conventional construction is installed in the channel or or duct 34, by means of which the sucked-in air can be more or less throttled or the air supply can be completely closed off.

During the driving operation, the channel or duct 34 is normally completely closed by means of the throttle 36 so that the rotary compressor 33 does not suck in and compress any air but merely runs along without doing any work. During the braking operation at first the fuel supply to the combustion chamber 20 is reduced to a minimum value or completely interrupted. The free working turbine 16 thus no longer transmits any torque to the driving wheels 14. In contrast thereto, the driving wheels 14 of the vehicle, which continues to roll, for example, when driving downhill, drive the shaft 30 by way of the shaft 32, the differential gear 13, the shaft 31 and the change-speed transmission 12. If the rotary compressor 33 is to be utilized for the purpose of braking, then the throttle 36 is opened so that air is sucked-in and is compressed. The compressor input power acts as braking power at the circumference of the driving wheels 14 and decelerates the vehicle.

The arrangement of the rotary compressor 33 ahead of the change-speed gear 12 permits to influence the rotational speed of the rotary compressor 33 by the selection of the speed engaged within the change-speed transmission. Since the drive of a rotary compressor 33 during braking, in contrast to the normal driving operation, emanates from the driven wheels 14, for example, the lowest speed of the change-speed transmission 12 produces the highest transmission ratio and therewith a high rotational speed of the rotary compressor 33. The input brake power absorbed by the rotary compressor 33 thus reaches correspondingly a high value. However, it is also possible to arrange the rotary compressor 33 at any other place of the power path from the free working turbine 16 to the driven wheels 14.

The absorbed or input power of the rotary compressor 33 can be changed by the position of the throttle 36. The throttle 36, instead of being arranged upstream of the rotary compressor 33, may also be arranged downstream thereof. The compressed air can be discharged into the atmosphere, can be stored, or can be supplied for further uses, for example, as illustrated in connection with FIG. 2.

Figure 2:
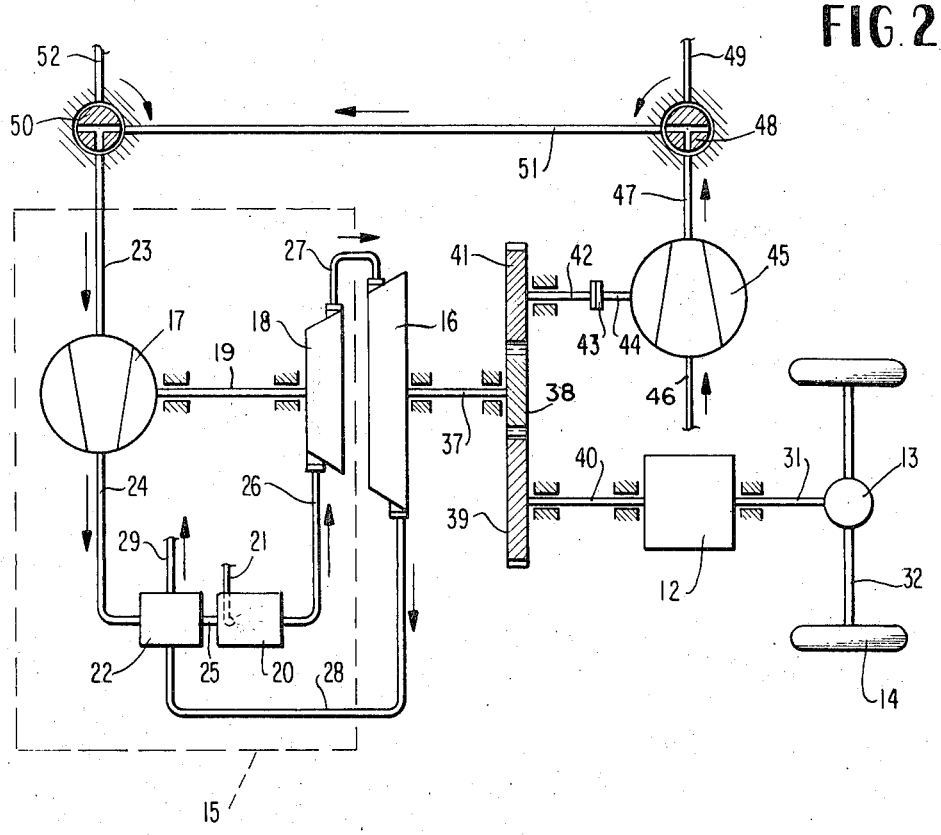
FIG. 2 is a schematic view of a modified embodiment of a brake installation which is arranged parallel to the power transmission from the working turbine to the driven wheels of a heavy-duty commercial-type motor vehicle equipped with a gas turbine drive.
Figure 3:
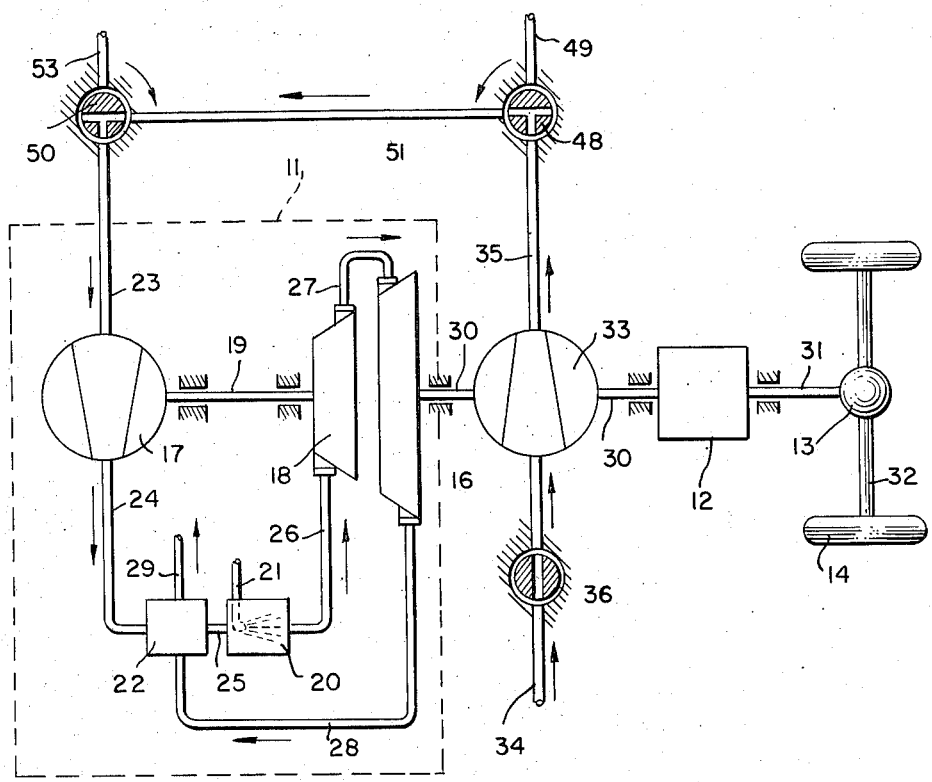
FIG. 3 is a schematic view of a modified embodiment of a brake installation which is similar to FIG. 1 with the further provision that the output side of the rotary compressor means is adapted to be connected with the input side of the gas producer for the gas turbine.

In the brake installation illustrated in FIG. 2, a spur gear 38 is secured on the shaft 37 of the free working or output turbine 16, which meshes with a spur gear 39 on the output shaft 40 of the change-speed transmission 12. The spur gear 38 additionally drives a spur gear 41 whose shaft 42 is adapted to be connected by means of a shifting clutch 43 of any conventional construction with the shaft 44 of a rotary compressor 45.

Reference numeral 46 designates the suction channel or duct of the rotary compressor 45. A channel or duct 47 for the compressed air leads from the rotary compressor 45 to a rotary valve 48, by means of which the duct 47 can be connected either with a channel or duct 49 leading into the atmosphere or with a channel or duct 51 leading to a further rotary valve 50. The suction channel or duct 23 of the compressor 17 is adapted to be selectively connected by means of the rotary valve 50 either with a channel or duct 52 leading into the atmosphere or with the channel 51. In lieu of the rotary valves 48 and 50 indicated in the schematic diagram, also corresponding flaps or the like may be used.

In the normal driving operation, the shifting clutch 43 is opened. The rotary compressor 45 is therewith separated from the drive and stands still. During braking operation, the shifting clutch 43 is closed or engaged so that the rotary compressor 45 is driven by the driving wheels 14 by way of the spur gears 38, 39 and 41 and thereby absorbs power which acts as brake power at the circumference of the driving wheels 14. The compressed air, depending on the position of the rotary valve 48, is discharged through the channel 49 into the atmosphere or, as illustrated in FIG. 2, is fed through the channel 51, the rotary valve 50 and the suction channel 23 to the compressor 17 of the gas producer 15. As a result thereof, the rotational speed of the shaft 19 of the gas producer 15, which rotates during braking at idling speed, can be raised which permits a rapid acceleration immediately after the braking. In case of failure of the starter of the gas turbine, it is possible in a similar manner by driving downhill or by towing to supply compressed air to the gas producer 15 and to thereby accelerate the same to the starting rotational speed. The shifting clutch 43 may be closed or opened, for example, by means of a manual switch or automatically in dependence on the position of the brake pedal by conventional means.

It is also possible to dispense with a shifting clutch and to arrange the rotary compressor 45 on its shaft in such a manner that it is seated loosely on its shaft during the driving operation whereas it is non-rotatably connected with the same in the braking operation to rotate in unison therewith and thus is able to absorb power.

FIGS. 3 to 6 show further modifications, wherein the features of FIGS. 1 and 2 discussed above are intermixed with one another, it being noted that like reference numerals are utilized in these figures to designate like structure as illustrated and discussed above with respect to FIGS. 1 and 2.

A considerable advantage of this installation resides in the fact that the rotary compressor can be utilized also in the normal vehicle operation for producing compressed air. If, for example, as illustrated in FIG. 2, the compressed air is supplied to the gas producer 15, then the partial load or the acceleration behavior of the gas turbine can be improved thereby. The pressure and quantity of the fed air can be influenced thereby by throttles or valves of any conventional construction. Another possibility for that purpose is the change of the rotational speed of the rotary compressor. This can be achieved by a slip clutch, for example, by a hydrodynamic coupling controllable by filling and discharge in a conventional manner.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An installation for the braking of motor vehicles which are driven by a gas turbine including a free working turbine means operatively connected with driving wheels, characterized in that a rotary compressor means is operatively connected with a power transmission means from the free working turbine means to the driving wheels in such a manner that the energy absorbed by said rotary compressor means acts as brake power on the driven wheels.

2. An installation according to claim 1, characterized in that the rotary compressor means is arranged in the power transmission means itself.

3. An installation according to claim 1, characterized in that the rotary compressor means is arranged in parallel to the power transmission means.

4. An installation according to claim 1, characterized in that the input power of the rotary compressor means is controllable by a throttle means for controlling the rate of air flow.

5. An installation according to claim 1, characterized in that the input power of the rotary compressor means is controllable by a slip clutch means.

6. An installation according to claim 1, characterized in that said slip clutch means is constituted by a hydrodynamic coupling.

7. An installation according to claim 1, characterized in that the rotary compressor means is adapted to be selectively engaged and disengaged in the braking and normal driving condition by a clutch.

8. An installation according to claim 1, characterized in that the rotary compressor means is selectively engaged and disengaged in the braking and driving operation by a free-wheeling device.

9. An installation according to claim 1, characterized in that the output side of the rotary compressor means is adapted to be connected with the input side of a gas producer for the gas turbine.

10. An installation according to claim 4, characterized in that the rotary compressor means is arranged in the power transmission means itself.

11. An installation according to claim 10, characterized in that the output side of the rotary compressor means is adapted to be connected with the input side of a gas producer for the gas turbine.

12. An installation according to claim 4, characterized in that the rotary compressor means is arranged in parallel to the power transmission means.

13. An installation according to claim 12, characterized in that the output side of the rotary compressor means is adapted to be connected with the input side of a gas producer for the gas turbine.

14. An installation according to claim 3, characterized in that the rotary compressor means is adapted to be selectively engaged and disengaged in the braking and normal driving condition by a clutch.

15. An installation according to claim 6, characterized in that the rotary compressor means is arranged in the power transmission means itself.

16. An installation according to claim 6, characterized in that the rotary compressor means is arranged in parallel to the power transmission means.

17. An installation according to claim 8, characterized in that the rotary compressor means is arranged in the power transmission means itself.

18. An installation according to claim 8, characterized in that the rotary compressor means is arranged in parallel to the power transmission means.

19. A braking installation for motor vehicles driven by gas turbine engines of the type having a gas producer including a gas producer compressor and gas producer turbine and a free power turbine driven by the flow of gases supplied by said gas producer, wherein said free power turbine is independently rotatable with respect to said gas producer compressor and said gas producer turbine, and wherein said free power turbine is drivingly interconnected by way of torque transmitting means to drive driven wheels of said vehicle; said braking installation comprising:
rotary compressor means independently rotatable with respect to said gas producer compressor,
and connecting means for selectively connecting said rotary compressor means to said torque transmitting means to apply energy absorbed by said rotary compressor means as braking forces to said driven wheels.

20. An installation according to claim 19, wherein said torque transmitting means includes a change-speed transmission, and wherein said connecting means includes means for connecting said rotary compressor means between said change-speed transmission and said free power turbine, whereby the effective braking forces applied by said rotary compressor means can be varied by said change-speed transmission.

21. An installation according to claim 19, further comprising gas conduit means for selectively connecting output gas supply from said rotary compressor means as input gas supply to said gas producer compressor.

22. An installation according to claim 20, further comprising gas conduit means for selectively connecting output gas supply from said rotary compressor means as input gas supply to said gas producer compressor.

23. An installation according to claim 20, wherein said rotary compressor means is disposed in series connection between said free power turbine and said change-speed transmission such that said rotary compressor means is rotatably driven by said free power turbine at all times said free power turbine is rotated, and wherein said connecting means includes control valve means for controlling at least one of supply of air to said rotary compressor means and supply of air from said rotary compressor means.

24. An installation according to claim 20, wherein said rotary compressor means is disposed in parallel relationship with said change-speed transmission such that, during normal drive of the vehicle, said rotary compressor means is not rotated by said free power turbine means, and wherein said connecting means includes selectively engageable clutch means for rotatably drivingly connecting said rotary compressor means to said change-speed transmission.

25. An installation according to claim 23, further comprising gas conduit means for selectively connecting output gas supply from said rotary compressor means as input gas supply to said gas producer compressor.

26. An installation according to claim 24, further comprising gas conduit means for selectively connecting output gas supply from said rotary compressor means as input gas supply to said gas producer compressor.

27. An installation according to claim 24, wherein said free power turbine means is drivingly connected to a first gear by a shaft, wherein said change-speed transmission is drivingly connected to said first gear by a second gear intermeshing with said first gear, and wherein said clutch means is interposed between said rotary compressor means and a third gear in driving intermeshing engagement with said first gear.

28. An installation according to claim 27, further comprising gas conduit means for selectively connecting output gas supply from said rotary compressor means as input gas supply to said gas producer compressor.

29. An installation according to claim 21, wherein said gas conduit means includes a first valve for selectively directing output gas flow from said rotary compressor means to one of atmosphere and a first gas line and a second valve for selectively connecting said first gas line to atmosphere and a second gas line leading into said gas producer compressor.

30. An installation according to claim 28, wherein said gas conduit means includes a first valve for selectively directing output gas flow from said rotary compressor means to one of atmosphere and a first gas line and a second valve for selectively connecting said first gas line to atmosphere and a second gas line leading into said gas producer compressor.

* * * * *